June 2, 1942.                R. FERRIS                2,285,114
COFFEE MAKING APPARATUS
Filed Nov. 16, 1938

INVENTOR
ROBERT FERRIS
By Paul, Paul, Moore & Grieg
ATTORNEYS

Patented June 2, 1942

2,285,114

UNITED STATES PATENT OFFICE 2,285,114

COFFEE MAKING APPARATUS

Robert Ferris, Minneapolis, Minn.

Application November 16, 1938, Serial No. 240,805

2 Claims. (Cl. 53—3)

This invention relates to new and useful improvements in coffee making apparatus, and more particularly to such apparatus wherein the coffee is steeped in a container and then discharged through a valve controlled opening into a receptacle .

Numerous attempts have heretofore been made to develop a coffee making apparatus for domestic use, which will require a minimum of care and attention in the operation of making the coffee. Most of these devices, however, are more or less complicated and/or require the constant attention of a person in order that the coffee may be properly made. It is well known that the flavor of coffee may vary considerably, from time to time, if the length of the steeping period is varied, even though the same quantities of coffee and water are used each time. To make coffee of uniform flavor, the steeping operation should therefore be controlled.

The construction of the apparatus should also be extremely simple and, so far as possible, the apparatus should be fool-proof in operation. The various parts of the apparatus should also be readily accessible to facilitate cleaning in order that the apparatus may be maintained in a sanitary condition with a minimum of labor.

The novel coffee making apparatus herein disclosed has been designed to provide an apparatus of the above mentioned character wherein all of the objectionable features now present in such apparatus have been eliminated, and whereby a simple and inexpensive coffee making apparatus is provided which comprises few parts, all of which may be readily separated from one another to facilitate cleaning. It comprises a simple valve, the operation of which is controlled by variations in the temperature of the liquid in the container, whereby after a predetermined time interval the valve is automatically opened to permit the steeped coffee to drain from the grounds into a suitable receiving receptacle.

An object of the present invention therefore, is to provide a coffee making apparatus of the character described, comprising a simple valve having an actuating member which is responsive to variations in the temperature of the brewed coffee, thereby to automatically open the valve at the termination of the steeping period, whereby the steeped coffee may drain into the lower receptacle.

Other objects of the invention reside in the novel construction of the valve operating mechanism, which is made in the form of a unitary structure, whereby it may readily and conveniently be removed from the container to facilitate cleaning; in the novel manner of supporting the operating mechanism within the container; and, in the general construction of the entire apparatus whereby it may be manufactured at small cost.

Other objects of the invention will appear from the following description and accompanying drawing and will be pointed out in the annexed claims.

In the accompanying drawing, there has been disclosed a structure designed to carry out the various objects of the invention, but it is to be understood that the invention is not confined to the exact features shown as various changes may be made within the scope of the claims which follow.

Figure 1:
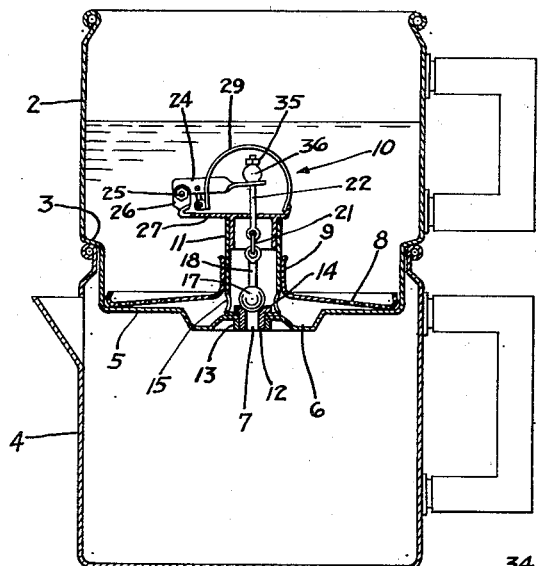
Figure 1 is a vertical sectional view of a coffee making apparatus showing the invention embodied therein.

In the selected embodiment of the invention here shown, there is illustrated in Figure 1, a coffee making apparatus of the general character disclosed in my patent, No. 1,962,494, issued June 12, 1934. This apparatus comprises a container 2 shown provided with an annular shoulder 3 adjacent its lower portion adapted to be engaged with the upper edge of a suitable receptacle 4. The bottom wall 5 of the container 2 is shown provided with a central recess 6 having a suitable valve opening 7 therein.

Means is provided in the bottom of the container 2 for straining and filtering the steeped coffee or other liquid as it is drained from the container 2 through the valve opening 7 into the receptacle 4. The means provided for thus filtering the coffee is shown comprising a disk-like filter member 8, having its horizontal wall suitably perforated. The filter member 8 is provided with an upstanding cylindrical portion 9, which preferably is axially alined with the valve opening 7. The cylindrical portion 9 is adapted to be fitted over a suitable neck or tubular member 11 having its lower end secured to the central portion of the bottom wall 5 of the container. For convenience, the tubular member 11 may be secured to the wall 5 by a bushing 12 which has an opening therethrough forming the valve opening 7. A suitable nut 13 may be secured to the lower end of the bushing 12 to secure it in place. The upper end of the bushing has a flanged head 14 which is shown clampingly engaging the inwardly turned flange of the lower member 11, thereby to secure it in position. Suitable apertures 15 are provided in the wall of the member 11 to permit liquid flow into the tubular member 11 and through the valve opening 7.

An important feature of the present invention resides in the novel valve control mechanism provided for controlling the liquid flow through the valve opening 7. This valve mechanism is in the form of a unitary structure, and is generally indicated by the numeral 10. As clearly illustrated in the drawing, the bushing 12 is provided at its upper end with a seat 16 adapted to be engaged by a valve 17, shown having a stem 18 provided at its upper end with a suitable eye 19.

The stem 18 is shown connected by a link 21 to the lower end of a rod 22, the upper end of which passes through a guide aperture 23 provided in an arm 24. The arm 24 is supported on a pivot 25 mounted in an upturned lug 26 of a plate 27. This plate has a guide opening 28 therein for maintaining the lower end of the rod 22 in axial alinement with the valve opening 7.

The plate 27 is shown provided with a depending portion 30 which preferably is tubular in cross-section, and of such size as to be readily received within the upper end of the tubular member 11. By this supporting the plate 27 on the member 11, the valve 17 will be pendently supported over the valve opening 7, when the control mechanism is in its normal condition, as when cold.

To actuate the valve 17, the arm 24 is shown operatively connected to the free end of a bi-metal element 29 by such means as a link 31. The opposite end of the element 29 is secured in fixed relation to the plate 27, as best shown in Figure 3.

Figure 2:
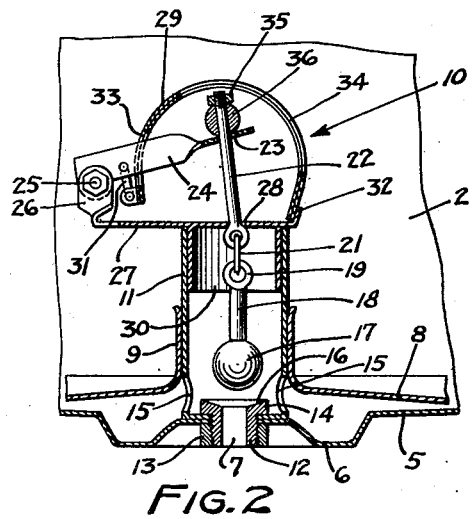
Figure 2 is an enlarged detail sectional view, of a portion of the container showing the valve in open position.

The bi-metal element 29 is shown having an elongated opening 33 for receiving the arm 24 and whereby the arm will be disposed in the medial plane of said element. The element 29 may also be provided with an elongated opening 34 in its upper portion to permit the passage of liquid therethrough. The upper end of the rod 22 may be adjustably supported in the arm 24 by a nut 35 received in threaded engagement with the upper end thereof. To eliminate friction and binding in the connection between the rod 22 and arm 24, a suitable spherical element 36 is preferably interposed between the arm 24 and the nut 35, as shown in Figures 2 and 3. The element 36 may, if desired, be dispensed with. The bi-metal element 29 is so constructed that when in normal condition, as when cold, it will retain the valve in open position, as shown in Figure 2.

Figures 3, 4:
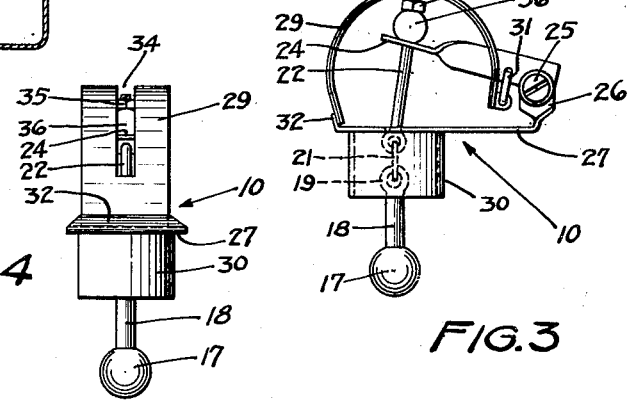
Figure 3 is a view showing the valve operating mechanism removed from the container as a unit.
Figure 4 is an end view of Figure 3.

The valve control mechanism 10, as hereinbefore stated, is in the form of a unitary structure, whereby it may be removed from the container 2 as a unit, as shown in Figures 3 and 4. The unit 10 is positioned in the lower portion of the container 2, so that when the boiling or hot water is poured into the container, the bi-metal element 29 will be submerged therein, as shown in Figure 1.

In the operation of the apparatus, a measured quantity of ground coffee is introduced into the container 2 onto the filter member 8. A predetermined quantity of boiling, or hot, water is then poured into the container and onto the bi-metal element 29 of the control unit 10. The moment the boiling water contacts the element 29, said element is distorted or deflected in a direction to lower the arm 24, whereby the valve 17 will move into closing engagement with the valve seat 16 and prevent liquid flow through the valve opening 7. The deflection of the bi-metal element 29 is so rapid, when contacted with the hot water, that the valve 17 is seated before the liquid reaches the valve opening 7. When the water in the container has cooled to a predetermined figure, the element 29 is deflected in the opposite direction, whereby the valve is opened to permit the steeped coffee or other liquid in the container to drain therefrom through the valve opening 7 into the receptacle 4. The timing of the valve may be controlled to some extent by manipulation of the nut 35 at the upper end of the stem 22.

The valve control mechanism 10 or unit is loosely supported on the tubular member 11 of the bottom wall of the container, whereby it may readily be removed from the container for cleaning purposes, as will readily be understood by reference to Figures 1, 2 and 3. The control mechanism comprises few parts, all of which are so constructed and arranged that they are not likely to become disarranged, as will readily be understood by reference to Figure 3.

Figure 5:
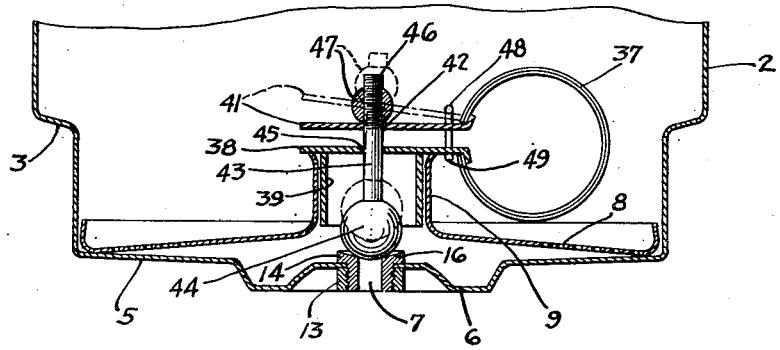
Figure 5 is a view showing a valve operating mechanism of slightly different construction.

In Figure 5, there is illustrated a control unit of slightly different construction, comprising a bi-metal element 37 of substantially circular configuration. A plate 38 is secured to one end of the element 37, and has a depending portion 39 adapted to be received in the upstanding portion 9 of the filter plate 8. The opposite end of the bi-metal element 37 has one end of an arm 41 secured thereto.

This arm is provided with an aperture 42 for receiving the upper end of a stem 43, having a valve 44 secured to its lower end adapted to engage the valve seat 16 to control liquid flow through the valve opening 7. The plate 38 has a similar aperture 45 for guidingly supporting the vertical movement of the stem 43. The upper end 46 of the stem is shown threaded to receive a suitable nut 47, whereby the valve may be vertically adjusted to control the timing of the valve. A suitable link 48 is shown having one end suitably secured to the plate 38, as shown at 49, and its upper end adapted to be engaged by the arm 41, thereby to limit the upward swinging movement thereof when the bi-metal element 37 is deflected to open the valve 44 when boiling or hot water is introduced into the container 2.

I claim as my invention:

1. In a coffee making apparatus, a container having a bottom provided with a discharge opening, a filter in the bottom of the container having an upstanding tubular portion, a valve for controlling flow through said opening, and a mechanism for automatically actuating the valve after a predetermined time interval, said mechanism comprising a plate having a portion interfitting with said upstanding portion to support said mechanism in the container, a bi-metal element having one end secured to the plate and its free end connected to the valve, said element being positioned to be engaged by the liquid in the container whereby it will respond to variations in the temperature of the liquid in the container and actuate the valve after a predetermined time interval to permit the steeped coffee to drain from the container.

2. In a coffee making apparatus, a container having a bottom provided with a discharge opening, the bottom of the container having an upstanding tubular portion, a valve for controlling flow through said opening, and a mechanism for automatically actuating the valve after a predetermined time interval, said mechanism comprising a plate having a portion interfitting with said upstanding portion to support said mechanism in the container, a bi-metal element having one end secured to the plate and its free end connected to the valve, said element being positioned to be engaged by the liquid in the container whereby it will respond to variations in the temperature of the liquid in the container and actuate the valve after a predetermined time interval to permit the steeped coffee to drain from the container.

ROBERT FERRIS.